United States Patent [19]

Harrigan et al.

[11] Patent Number: 4,763,173
[45] Date of Patent: Aug. 9, 1988

[54] IMAGING SYSTEM FOR COMPENSATING FOR IMAGE DISTORTION DUE TO WRINKLED OR CURLED DOCUMENTS

[75] Inventors: Michael E. Harrigan, Webster; James D. Rees, Pittsford; Robert P. Rebres, Fairport, all of N.Y.

[73] Assignee: Xerox Corporation, Stamford, Conn.

[21] Appl. No.: 98,175

[22] Filed: Sep. 18, 1987

[51] Int. Cl.⁴ .............................................. G03B 27/68
[52] U.S. Cl. ........................................ 355/52; 355/8; 355/75
[58] Field of Search ................... 355/8, 11, 52, 55, 75, 355/14 SH, 76

[56] References Cited

U.S. PATENT DOCUMENTS

| | | | |
|---|---|---|---|
| 3,980,405 | 9/1976 | Tatsuno et al. | 355/52 X |
| 4,043,665 | 8/1977 | Caldwell | 355/76 |
| 4,335,954 | 6/1982 | Phelps | 355/14 |
| 4,538,185 | 8/1985 | Wiggins | 355/75 X |
| 4,723,154 | 2/1988 | Kuwayama | 355/52 |

OTHER PUBLICATIONS

Rudolf Kingslake; "Lenses in Photography (The Practical Guide to Optics for Photographers)"; Published by the Case-Hoyt Corporation for Garden City Books.

John R. Egger; "Use of Fresnel Lenses in Optical Systems; Some Advantages and Limitations"; Optical Sciences Group, SPIE; vol. 193, Optical Systems Engineering, (1979).

Primary Examiner—Richard A. Wintercorn

[57] ABSTRACT

A document imaging system is compensated for distortion caused by non-planarity in the documents by providing a positive lens with varying power at a location beneath the document platen. In a preferred embodiment, an aspheric fresnel lens is used as the compensating optical element.

5 Claims, 4 Drawing Sheets

IMAGING SYSTEM FOR COMPENSATING FOR IMAGE DISTORTION DUE TO WRINKLED OR CURLED DOCUMENTS

BACKGROUND AND PRIOR ART STATEMENT

This invention relates generally to a document reproduction apparatus and, more particularly, to a flash illumination imaging system designed to reduce the distortion effects resulting from original documents having creases and curls.

Present day high-speed copiers and duplicators such as the Xerox Model 1075 and Xerox Model 1090 utilize flash exposure of an entire document to create an image of the document on a photoreceptor belt. These high-speed copiers typically employ some type of automatic document handler to move documents to and from the exposure location on a platen. They also utilize a mirror-less optical system which incorporates a wide angle lens to project a full-frame image of an illuminated document onto a flat photoreceptor surface. A particular problem encountered with these types of systems is the inability to faithfully reproduce those portions of an original document which are not perfectly flat, e.g., have been subject to creasing, wrinkling or curling. This is caused by the fact that the lens has a larger field angle than an optical system using a folded mirror optical path. While the lens has sufficient depth of focus to compensate for curling; straight lines in curled or wrinkled areas appear curved (distorted) at the image plane. As shown in FIG. 1, document 4, placed on platen 6, has; as an example, a curl at its edge. With a flash illumination system, a chief ray through point P on the document edge is imaged as though its point was at P1 and projected by a lens 8 as a focused, distorted image at an imaging plane. The desired position for point P is at point P'', the position of the document edge in a curl-free condition. (For simplicity the shift of the chief ray as it passes through the platen is not shown). The amount of distortion of the imaged point is proportional to the angle $\theta$; e.g. large angles of $\theta$ cause more image distortion. The desired condition is $\theta = 0$. A further description of this distortion effect is found on pages 39-40 of "Lenses in Photography" by Rudolf Kingslake, 1951, Case-Hoyt Corporation, Rochester.

For open platen copying, an operator can usually manually flatten the document during the copying mode. Since this is not possible during a document handling mode, several expedients are known in the art to correct or compensate for this problem. In U.S. Pat. No. 4,335,954, a document transported to the top of a platen is maintained in a flat orientation by a clamp mechanism which is lowered to flatten the document during the exposure. In U.S. Pat. No. 4,043,665 a document handling system is disclosed which includes a vacuum belt spaced a small distance above the platen. These systems compensate to some degree for minor document wrinkling, but they do not entirely solve the problem of the more severe wrinkles and curls. It is also not appropriate for use with applications requiring book copying.

The present invention is directed towards a mechanism for reducing or eliminating distortion caused by imaging non-planar documents located in an object plane. The invention includes modifying the document platen in such a way as to add positive optical power so as to bend the imaged rays in order to reduce the distortion effects of non-planar (wrinkled or curled) portions of the document. More particularly, the invention is directed towards a transparent platen located in an object plane; means for positioning an original document on the surface of said platen; means for projecting an image of said document onto a photosensitive surface; and a positive lens element positioned between said platen and said projection lens said lens adapted to compensate for distortion caused by imaging of non-planar portions of said documents.

DETAILED DESCRIPTION OF THE DRAWINGS

DETAILED DESCRIPTION OF THE INVENTION

Figure 2:
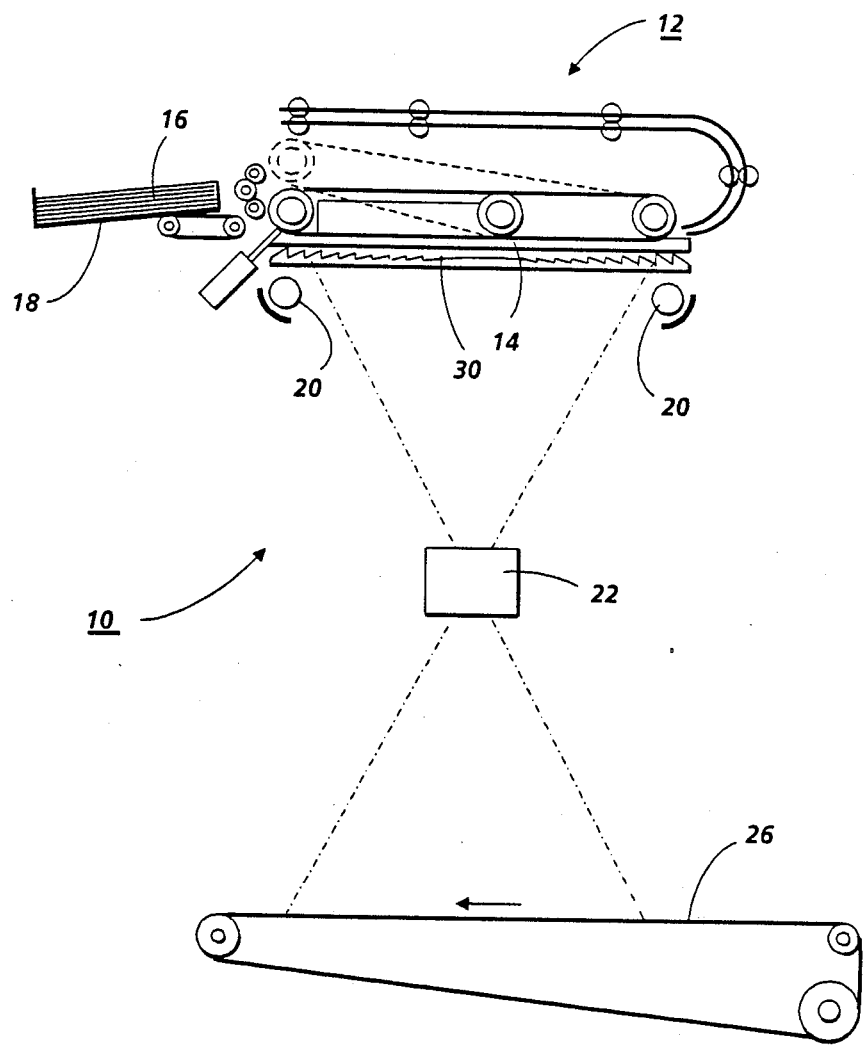
FIG. 2 is a side schematic of an imaging system showing a fresnel lens positioned beneath a platen for compensating for image distortion.

An illustrative schematic of a document imaging system incorporating one embodiment of the present invention is shown in FIG. 2. While only the imaging system is shown, it is understood that the image projected onto the charged photoreceptor surface can be developed, transferred to a copy sheet 1 and then fused to produce a permanent output copy. These xerographic functions are well known in the art. Referring then to FIG. 2, imaging system 10 includes a document handling unit, indicated generally by the reference numeral 12 which is positioned over a platen 14. Document handling unit 12 sequentially feeds documents 16 from a stack of documents placed by the operator face down in a normal forward collated order in document stacking and holding tray 18. The documents are fed from the bottom of the stack, in seriatim, to platen 14. Lamps 20 illuminate the document positioned on transparent platen 14. The light rays reflected from the document are transmitted through wide angle lens 22. Lens 22 focuses the light image of the original document onto a charged portion of the photoconductive surface of belt 26 to selectively dissipate the charge thereof. This action forms an electrostatic latent image on the photoconductive surface which corresponds to the informational areas of the original document. Thereafter, belt 26 advances the electrostatic latent image recorded on the photoconductive surface to a development station and through the subsequent xerographic stations (not shown).

It is understood that the document can be advanced onto the exposure position on the platen by other types of document handling. Documents or books, magazines and the like can be placed manually on the platen.

Figure 3:
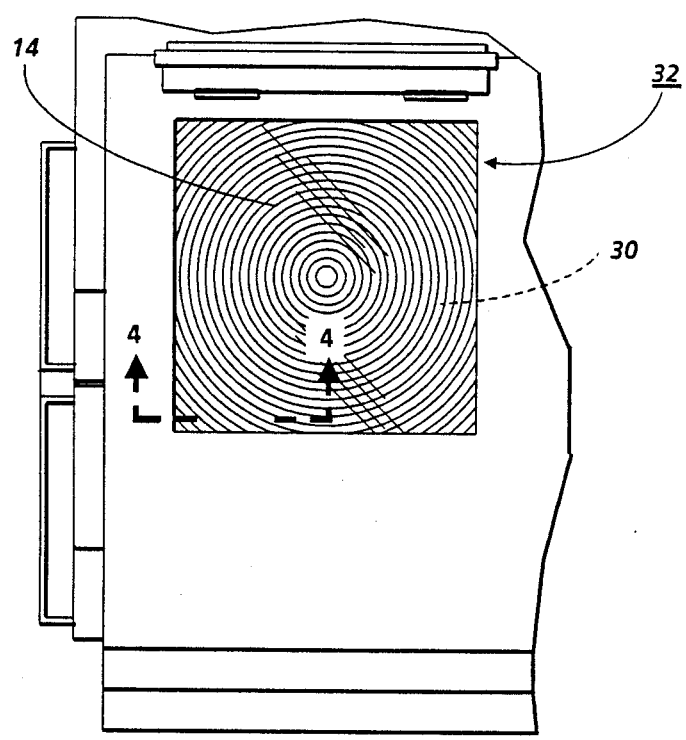
FIG. 3 shows a top view of the platen and fresnel lens shown in FIG. 2.

Also shown in FIG. 2 and in top view in FIG. 3 is a aspheric fresnel lens element 30. Lens 30 is characterized by varying power from the center outward and has the function of collimating the chief rays and removing distortion resulting from the wrinkled or creased areas of the original document. Lens 30 in a preferred embodiment, has a diagonal at least equal to that of the platen (FIG. 3) and having characteristics described in further detail below.

Figure 1:
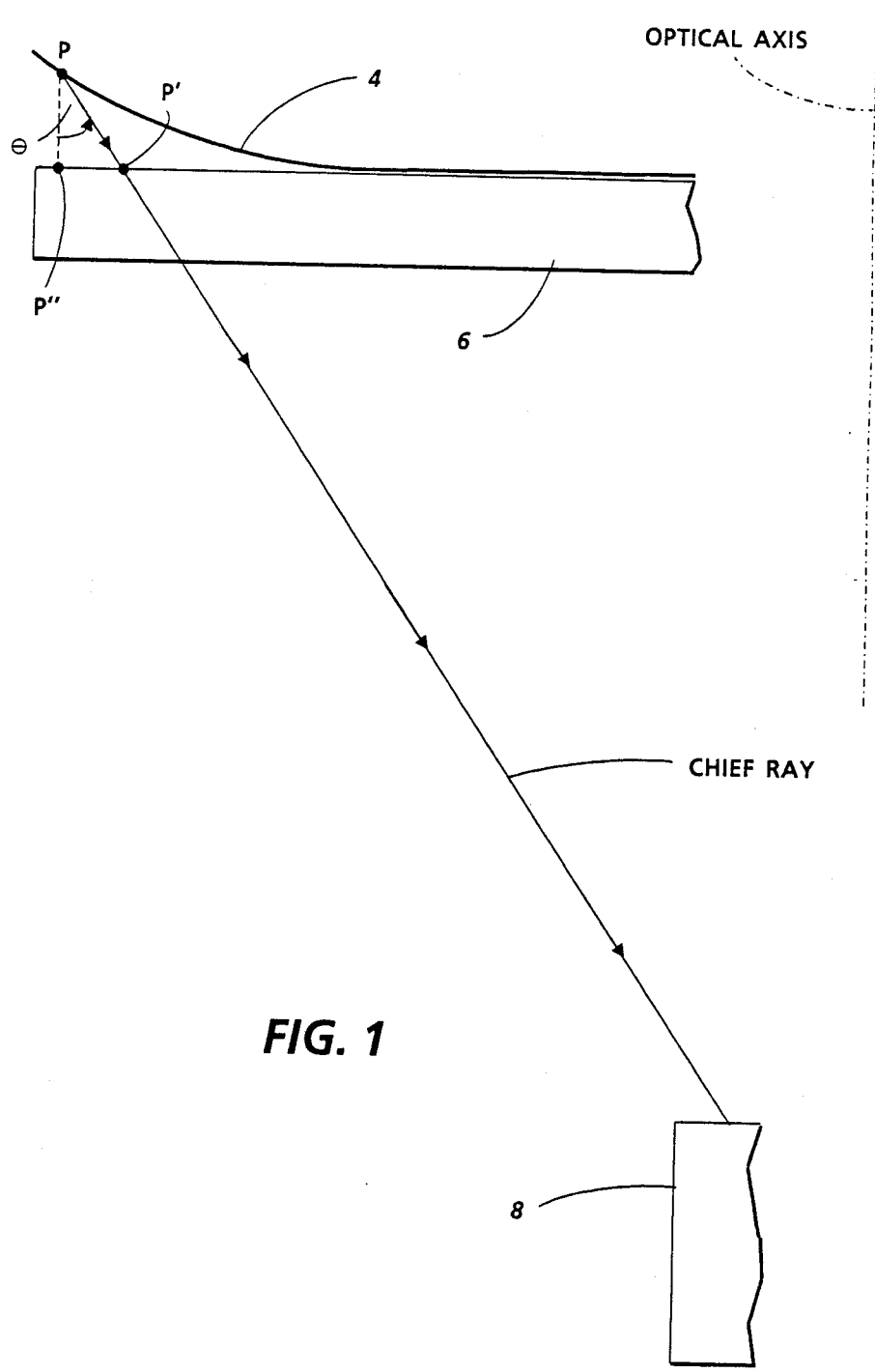
FIG. 1 is a side schematic view of a portion of a document imaging system demonstrating image distortion resulting from a document with a curled edge.
Figure 4:
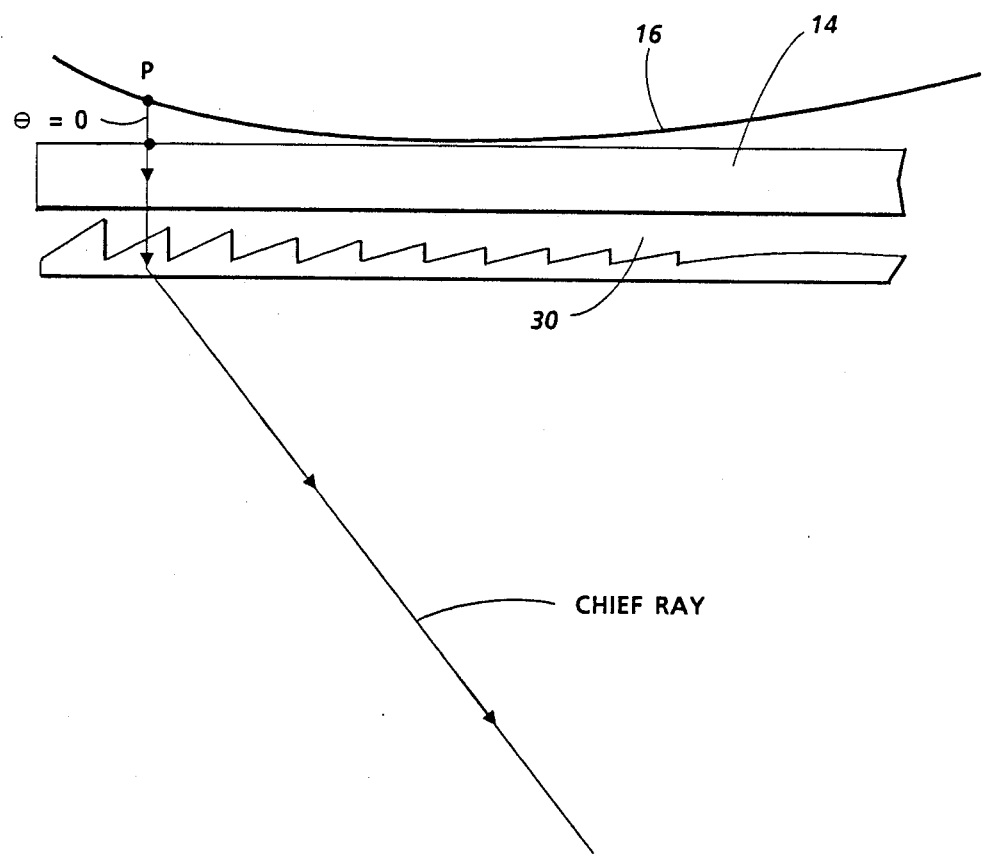
FIG. 4 is an enlarged cross-sectional view of a portion of the imaging system of FIGS. 2, 3 demonstrating the edge compensating action of the fresnel lens.

Reference is now made to FIG. 4 to describe the compensating action of lens 30. The portion of the platen 14 is shown with a curled document 16 thereon. Lens 30 is designed so that the chief ray passing through point P on the curled edge is perpendicular to the platen at the edge. Stated in another way, and referring to FIG. 1, the distortion angle $\theta$ has been reduced to zero thereby eliminating the image distortion at the image plane.

As stated above in the embodiment, element 30 is an aspheric fresnel lens. The use of fresnel lenses are known in the document projection art, particularly as the document platen in an overhead projector. They are manufactured in plastic, can be compression or injection molded, are typically a few millimeters thick and relatively inexpensive. Details as to fresnel lens function and manufacturing are disclosed in an article "Use of Fresnel lenses in Optical Systems . . . " by John R. Egger, SPIE Vol. 193 Optical Systems Engineering (1979), pp. 63–65. The contents of this article are hereby incorporated by reference. A fresnel lens conforming to the specification of this article, and having dimensions corresponding to a 22" square platen was tested with a document having a center crease which extends 8 mm above the platen. The fresnel lens removed almost all of the distortion.

The specific design for the fresnel lens must be tailored to the anticipated use of a machine. For many systems, the reproduction of a letter-size document at 1× magnification would be the most useful. For this case, the optical axis of the fresnel lens would coincide with the optical axis of the projection lens at its 1× location. Other document sizes and/or magnifications can be assembled by appropriate design of the fresnel lens. When copying half tones, the groove spacing may be decreased to eliminate undesirable Moire patterns in the output copy.

While the invention has been described with reference to the structure disclosed, it is not confined to the details set forth, but is intended to cover such modifications or changes as may come within the scope of the following claims:

For example, while the preferred lens embodiment is an aspheric fresnel lens, other aspheric positive lenses with varying power may also be used. For small angles of $\theta$ (small distortions), a spherical lens with single power, either fresnel or conventional may be used. And while the preferred embodiment uses the fresnel lens with a grooves facing upward towards the bottom of the platen, the invention can be practiced with the optical lens element positioned on top of the platen, groove side facing downward, or upward and also on the bottom with grooves facing up.

What is claimed is:

1. A document imaging system including:
   a transparent platen located in an object plane;
   means for positioning an original document on the surface of said platen;
   means for projecting an image of said document onto a photosensitive surface; and
   a positive lens element positioned between said platen and said projection lens said lens adapted to compensate for distortion caused by imaging of nonplanar portions of said documents.

2. The imaging system of claim 1 wherein said positive lens element is an apsheric positive lens with varying power.

3. The imaging system of claim 1 wherein said positive lens element is an aspheric fresnel lens.

4. The imaging system of claim 3 wherein the fresnel lens is located beneath the platen with the grooved surface facing upward towards the bottom surface of the platen.

5. The imaging system of claim 3 wherein the fresnel lens is located above the platen and the grooved surface faces downward towards the top surface of the platen.

* * * * *